US008964706B2

(12) United States Patent
Frederiksen et al.

(10) Patent No.: US 8,964,706 B2
(45) Date of Patent: Feb. 24, 2015

(54) COMMUNICATION METHOD AND SYSTEM

(75) Inventors: Frank Frederiksen, Klarup (DK); Klaus Ingemann Pedersen, Aalborg (DK)

(73) Assignee: Nokia Siemens Networks Oy, Espoo (FI)

( * ) Notice: Subject to any disclaimer, the term of this patent is extended or adjusted under 35 U.S.C. 154(b) by 869 days.

(21) Appl. No.: 13/127,779

(22) PCT Filed: Nov. 5, 2008

(86) PCT No.: PCT/EP2008/065014
§ 371 (c)(1),
(2), (4) Date: May 16, 2011

(87) PCT Pub. No.: WO2010/051839
PCT Pub. Date: May 14, 2010

(65) Prior Publication Data
US 2011/0237284 A1    Sep. 29, 2011

(51) Int. Cl.
*H04J 3/06*     (2006.01)
*H04W 16/14*    (2009.01)
*H04W 56/00*    (2009.01)
*H04W 16/10*    (2009.01)
*H04W 92/20*    (2009.01)

(52) U.S. Cl.
CPC ............. *H04W 16/14* (2013.01); *H04W 56/00* (2013.01); *H04W 16/10* (2013.01); *H04W 92/20* (2013.01)
USPC ........................... 370/337; 370/442; 455/524

(58) Field of Classification Search
None
See application file for complete search history.

(56) References Cited

U.S. PATENT DOCUMENTS

| | | | |
|---|---|---|---|
| 2002/0015393 A1* | 2/2002 | Pan et al. ....................... | 370/335 |
| 2006/0268792 A1* | 11/2006 | Belcea ........................... | 370/338 |
| 2007/0117537 A1 | 5/2007 | Hui et al. ....................... | 455/405 |
| 2008/0130593 A1* | 6/2008 | Scheinert et al. ............. | 370/337 |
| 2008/0205431 A1* | 8/2008 | Park et al. ..................... | 370/458 |
| 2009/0052353 A1* | 2/2009 | D'Amico et al. ............. | 370/280 |
| 2009/0122782 A1* | 5/2009 | Horn et al. .................... | 370/350 |
| 2009/0213782 A1* | 8/2009 | Yee et al. ....................... | 370/321 |
| 2009/0275323 A1* | 11/2009 | Pedersen et al. .............. | 455/419 |
| 2011/0286421 A1* | 11/2011 | Hu ................................. | 370/329 |
| 2012/0026970 A1* | 2/2012 | Winters et al. ................ | 370/330 |

OTHER PUBLICATIONS

R1-083103, "Autonomous Component Carrier Selection for LTE-Advanced", 3GPP TSG RAN WG1 #54 Meeting, Jeju Island, Korea, Aug. 18-22, 2008, Nokia Siemens Networks, Nokia, 4 pgs.
R1-083733, "Algorithms and Results for Autonomous Component Carrier Selection for LTE-Advanced", 3GPP TSG RAN WG1 #54bis Meeting, Prague, Czech Republic, Sep. 29-Oct. 3, 2008, Nokia Siemens Networks, Nokia, 5 pgs.

* cited by examiner

*Primary Examiner* — Duc Duong
(74) *Attorney, Agent, or Firm* — Harrington & Smith

(57) ABSTRACT

A method of co-ordinating communication between a plurality of base stations in a communication system, including designating timeslots where said base stations receive and/or transit co-ordination messages to each other. The system may be an autonomous cellular system and the timeslots may be regularly spaced.

31 Claims, 4 Drawing Sheets

COMMUNICATION METHOD AND SYSTEM

FIELD OF THE INVENTION

This invention relates to communications systems and has particular but not exclusive application to local areas (e.g. autonomous) cellular communications systems.

BACKGROUND TO THE INVENTION

A proposal for LTE-A (Long Term Evolution Advanced) radio systems is autonomous component carrier selection. In such systems, an arrangement of base stations in a communication system such as a cellular communication system, also referred alternatively as Node B's, operate generally without central control. Conventional systems generally include a network controller for example.

This enables cheap uncoordinated deployment of Node Bs in local area environments. More details for this can be found in on-line documents R1-083733 and R1-083103 at http://www.3gpp.org.

An autonomous component carrier selection scheme has been proposed which relies on a concept where each cell automatically selects one of the component carriers as its primary carrier (also some-times called the base carrier). The primary/base carrier is assumed to be used for initial connection of User Equipment e.g. terminals in the cell. Depending on the offered traffic in a cell and the mutual interference coupling with the surrounding cells, transmission/reception on all component carriers may not always be the best solution. It is therefore proposed that each cell dynamically selects additional component carriers for transmission/reception as well. The latter is referred to as selection of secondary component carriers (also some-times called extended carriers). All component carriers not selected for primary or secondary are completely muted (uplink/downlink) and not used by the cell. In order to have efficient autonomous component carrier selection at each Node B (also referred to alternatively as a base station or an eNB in 3GPP terminology, some information from the neighbouring Node Bs is also needed by an Node B, and this information is assumed to be available via inter Node B over-the-air communication (OTAC) for cases where there is no X2 between the Node Bs (i.e., meaning Home/Femto Node B cases). X2 is a common interface between eNodeB's. One of the major challenges for inter Node B OTAC is how to coordinate such transmissions/receptions among the Node Bs, which are within the same local area cluster. The latter is assumed to be the case for both FDD and TDD. However, a Node B may be able to receive multiple OTAC messages from different Node Bs at the same time if these are sent on different component carriers. If the OTAC messages use a cell-specific scrambling/spreading component, it might even be possible to receive multiple OTAC messages within the same component carrier at the same time. There is a requirement to provide an accurate method for coordinating the transmission and reception of OTAC messages. The invention provides for Node Bs to send OTAC messages. The invention also provides rules for when Node Bs have to be in Discontinuous reception (DTX) for reception of potential OTAC messages by other Node Bs in the close vicinity.

STATEMENT OF THE INVENTION

According to a first aspect of the invention there is provided a method of co-ordinating communication between a plurality of base stations in a communication system, comprising designating and or synchronising timeslots where said base stations receive and/or transit information to each other.

The information may pertain to co-ordination of said base stations. The information may be OTAC messages.

The base station may be part of a cellular communication network, such as an autonomous network.

Preferably the timeslots are regularly spaced.

In a preferred embodiment the timeslots are a function of system frame number (SFN).

In an alternative preferred embodiment the timeslots may be based on monitoring and adopting the patterns of neighboring base stations.

In an embodiment, the method includes determining if the base station has a message to transmit, and if not it listening to potential messages coming from other base stations.

Another embodiment includes determining if a base station has a co-ordination message to be transmitted, and if so transmitting the information in the first coming timeslot.

The information may be retransmitted automatically. In another preferred embodiment, the information may be retransmitted after N timeslots periods. N may be a (pseudo) random integer. In one embodiment N may be different from and varies between different base stations. N may be based on base station ID.

According to a second aspect of the invention there is provided a computer readable medium comprising a computer program thereon, said computer program performing the methods of the invention.

According to a third aspect of the invention a base station adapted to receive and/or transit information to or from one or more other base stations during designating and/or synchronised timeslots.

The information may pertain to co-ordination of a plurality of base stations in a communication system, such as an autonomous cellular communication system.

According to a fourth aspect of the invention there is provided a communication system comprising a plurality of base stations, said base stations adapted to receive and/or transit information to or from one or more other base stations during designating and/or synchronised timeslots.

SUMMARY OF FIGURES

For a better understanding of the present invention and how the same may be carried into effect, reference will now be made by way of example only and to the accompanying drawings in which.

DETAILED DESCRIPTION OF EXEMPLARY EMBODIMENTS

Figure 1:
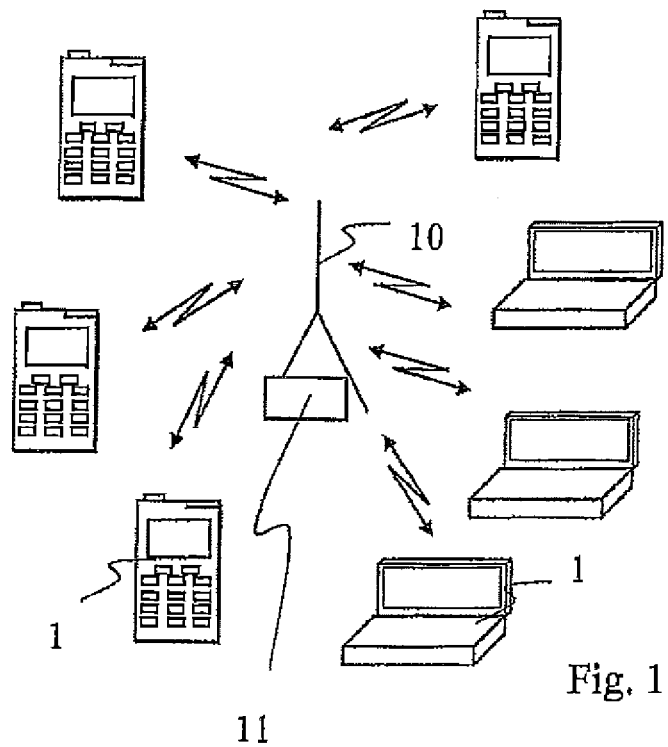
FIG. 1 shows schematically a conventional LTE system.

Before explaining in detail a few exemplifying embodiments, a brief explanation of wireless access is given with reference to FIG. 1 which shows a conventional communication system 1 providing wireless communications to a plurality of communication devices 2. The communication device, for example a mobile user device or equipment, can be used for accessing various services and/or applications provided via the wireless communication system. The communication device can typically access wirelessly a communication system via at least one wireless transmitter and/or receiver Node B 3 of an access system. Non-limiting examples of access nodes are a base station of a cellular system, for example a 3G WCDMA Node B, a base station of a wireless local area network (WLAN) and a satellite station of a satellite based communication system.

The communications may be arranged in various manners based on an appropriate radio access technology or technologies. The access is provided via radio channels also known as access channels. Each communication device 1 may have one or more radio channels open at the same time. Each communication device may be connected wirelessly to more than one base station 3 or similar entity. Also, a plurality of communication devices may communicate with a base station or similar, and/or attempt to access the communication system via the same base station. A plurality of communication devices may also share a channel. For example, to start communications or to connect to a new access system, a plurality of communications devices may attempt to make the initial contact via a single channel, for example via a random access channel (RACH). The attempts to access may be made substantially at the same time.

The base station (eNode B) can be connected to other parts of the communication system via appropriate connections, for one or more appropriate gateway nodes. The eNode B 3 has an antenna for communicating with the user equipment via wireless link. The eNode B has a data processing entity for carrying out various processes. Additionally a memory is provided which stores information which is used by the eNode B. A base station is typically controlled by at least one appropriate controller apparatus, e.g. network controller, generally denoted by 4 and can be provided for managing of the operation of the base station and/or communications via the base station. The controller apparatus is typically provided with memory capacity and at least one data processor. Various functional entities may be provided in the controller by means of the data processing capability. The functional entities provided in the base station controller may provide functions relating to radio resource control, access control, packet data context control, relay control and so forth.

A user device 2 can be used for various tasks such as making and receiving phone calls, for receiving and sending data from and to a data network and for experiencing, for example, multimedia or other content. For example, a communication device may access applications provided via a telephone network and/or a data network, such as applications that are provided based on the Internet Protocol (IP) or any other appropriate protocol. An appropriate mobile communication device may be provided by any device capable of at least sending and/or receiving wireless signals from the access system. Non-limiting examples include a mobile station (MS) such as a mobile phone or a smart phone, a portable computer provided with a wireless interface card or other wireless interface facility, personal data assistant (PDA) provided with wireless communication capabilities, or any combinations of these or the like. The communication device 1 is typically provided with appropriate data processing apparatus.

Figure 2:
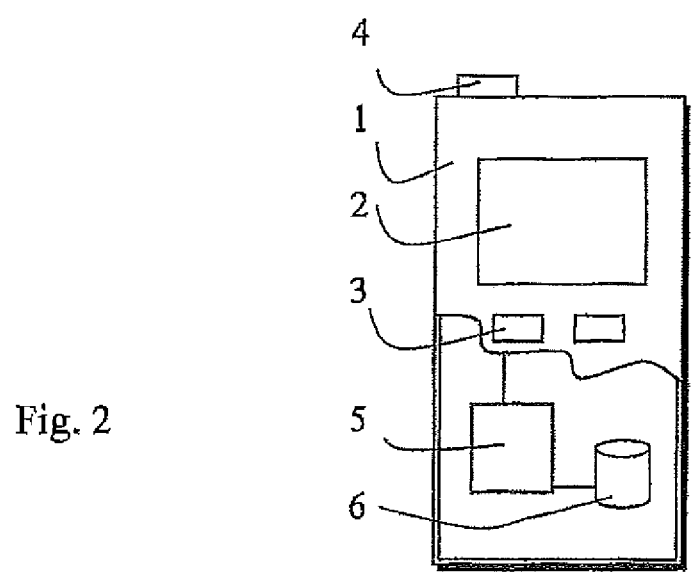
FIG. 2 shows elements the system of FIG. 1 in more detail.

FIG. 2 shows in more detail the system of FIG. 1 and shows this architecture only to give an example of a possible communication system where the embodiments described below may be provided and that other arrangements and architectures are also possible. For example, the user device may communicate with a different access system. The eNode B 3 has an antenna 5 for communicating with the user equipment via wireless link. The eNode B has a data processing entity 6 for carrying out various processes. Such processes may include some embodiments of the invention. Additionally a memory 7 is provided which stores information which is used by the eNode B. It is noted that the embodiments of the invention and functionality may be provided according to some embodiments of the invention by a separate component to the data processing entity. In some embodiments the functionality of the methods according to some embodiments of the invention are carried out by other parts of a system separate from the node B. For example in an embodiment the functionality may be carried out by network controllers.

The mobile device may communicate via an appropriate radio interface arrangement of the mobile device. The interface arrangement may be provided for example by means of a radio part 8 and associated antenna arrangement. The antenna arrangement may be arranged internally or externally to the mobile device. A mobile device is typically provided with at least one data processing entity 9 and at least one memory 10 for use in tasks it is designed to perform. The data processing and storage entities can be provided on an appropriate circuit board and/or in chipsets. This feature is denoted by reference 11. The user may control the operation of the mobile device by means of a suitable user interface such as key pad 12, voice commands, touch sensitive screen or pad, combinations thereof or the like. A display 14, a speaker and a microphone are also typically provided. Furthermore, a mobile device may comprise appropriate connectors (either wired or wireless) to other devices and/or for connecting external accessories, for example hands-free equipment, thereto. A modulator component 13 is also shown.

Some embodiments of this invention are related to the long term evolution (LTE) of 3GPP. In the proposed LTE structure the base station is called eNode B. The physical layer is based on SC FDMA (single carrier division multiple access) for the Uplink and OFDMA (orthogonal frequency division multiple access) for the downlink.

Certain embodiments can be used in a long term evolution (LTE) radio system. The long term evolution (LTE) is a system which provides an evolved radio access system that is connected to a packet data system. Such an access system may be provided, for example, based on architecture that is known from the Evolved Universal Terrestrial Radio Access (E-UTRA) and based on use of the Evolved Universal Terrestrial Radio Access Networks (E-UTRAN) Node Bs (eNode Bs). An Evolved Universal Terrestrial Radio Access Network (E-UTRAN) consists of E-UTRAN Node Bs (eNode Bs) which are configured to provide base station and control functionalities. For example, the Node Bs nodes can provide independently radio access network features such as user plane radio link control/medium access control/physical layer protocol (RLC/MAC/PHY) and control plane radio resource control (RRC) protocol terminations towards the user devices.

Figure 3:
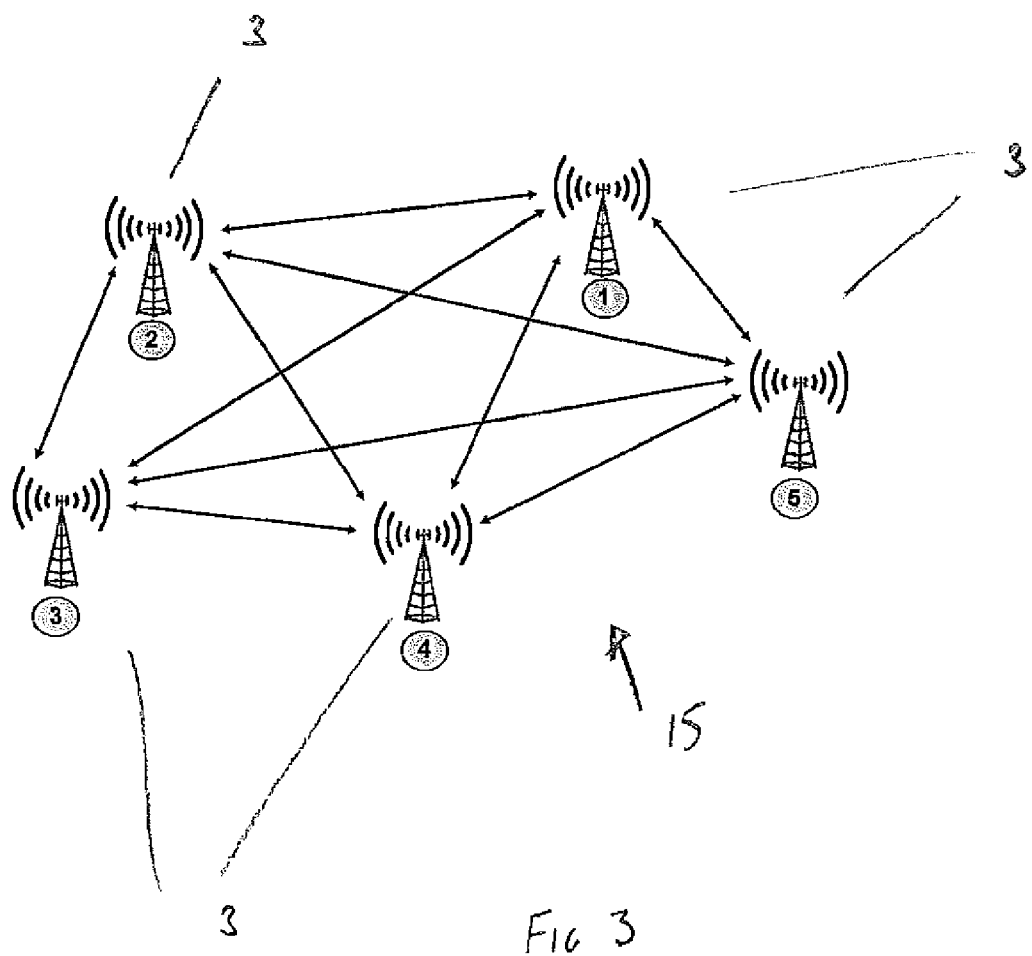
FIG. 3 Simple illustration of a local area autonomous system with five eNode Bs having OTAC wherein an embodiment of the invention may be utilised.
Figure 4:
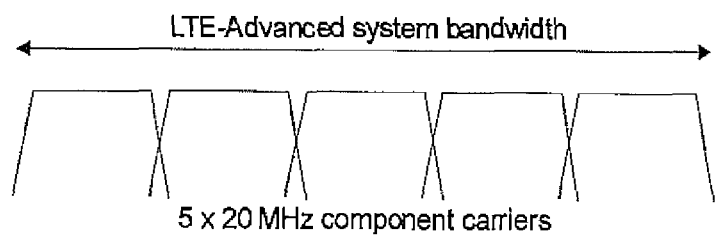
FIG. 4 shows an example of component carriers forming which may be utilised with the FIG. 3 system.

FIG. 3 shows a schematic example of a particular type of autonomous cellular communication system.

The autonomous system or network includes a plurality of Node B's 3, whose main function is to communicate and serve User Equipment, such as mobile telephones (not shown) in their respective cells. The base stations communicate with each other via OTAC. Such a system may embody embodiments of the invention. It may employ an autonomous component carrier selection scheme. Such a system is similar to that described above, except that there is no central coordinated control. Such as system may operate in both FDD and TDD mode, and is mainly estimated to provide performance benefits in local area environments such as indoor scenarios, and outdoor hotspot areas with dense deployment of pico/micro cells. However the invention and embodiments are not limited to this. Such systems typical may employ autonomous eNode-B component carrier selection concept for LTE-Advanced. The basic idea is that each cell selects at least one active component carrier. Secondly, cells dynamically select additional component carriers, depending on the offered traffic conditions, radio conditions, etc. Component carriers not being selected by a cell may be muted, i.e. no transmission of any uplink downlink channels and reference symbols is performed. The proposed concept essentially provides a simple autonomous self adjusting frequency reuse mechanism for LTE-Advanced, which is considered especially beneficial for local area environments such as outdoor municipal hot spot areas and indoor pico cell cases with uncoordinated (home) eNode-B deployment.

In a typical system, the LTE-Advanced system bandwidth is assumed to consist of a number of separate component carriers. In the example of FIG. 3 where there are 5 base stations, with 100 MHz system bandwidth, 5 component carriers of 20 MHz are generally assumed. Assuming a bandwidth configuration with M=5 component carriers of e.g. 20 MHz bandwidth, each of the 5 Node Bs will have selected different component carriers for their primary. This means that if for instance a Node B is silent, then it is in principle able to receive parallel OTAC messages sent from all other Node Bs on different component carriers. However, assuming realistic filtering and transceiver implementation, a Node B cannot receive on one component carrier while at the same time transmitting on other component carriers. However, other configurations such as e.g. 4 component carriers of 10 MHz, or sets of component carriers with different bandwidth sizes could be configured as well according to embodiments of the invention. A Rel'8. A Rel'8 terminal is a UE which is produced according to the 3GPP LTE Release 8 specifications. For LTE-A it is envisioned that backwards compatibility should be maintained, such that Rel'8 UEs should still be able to operate, even that the network is upgraded to higher releases terminal is assumed to be served by a single component carrier, while LTE-Advanced terminals can be served simultaneously on multiple component carriers.

In one configuration, each cell automatically selects one of the component carriers as its primary carrier (also some-times called the base carrier). The primary/base carrier is assumed to be used for initial connection of terminals in the cell. Depending on the offered traffic in cell and the mutual interference coupling with the surrounding cells, transmission/reception on all component carriers may not always be the best solution. It is therefore proposed that each cell dynamically selects additional component carriers for transmission/reception as well. The latter is referred to as selection of secondary component carriers (also some-times called extended carriers). All component carriers not selected for primary or secondary are completely muted (uplink/downlink) and not used by the cell.

For autonomous selection of primary and secondary component carriers. Once a new LTE-Advanced (home) eNode-B is switched on, it shall start by selecting one of the component carriers as its primary. UEs can not connect to the eNode-B before the primary carrier has been selected, and no signals are transmitted from it. The information available for selection of the primary component carrier is therefore mainly local eNode-B measurements (e.g. uplink received interference on each component carrier) as well as potential information from surrounding active eNode-B on which component carriers they have selected. Once the eNode-B has selected its primary component carrier, it can start to carry traffic. The quality of the primary component carrier is hereafter monitored by the eNode-B, and in case quality problems are detected, it may trigger a reselection, where another component carrier is selected as the primary. As the offered traffic increases for the cell, the eNode-B starts to allocate additional secondary component carriers, if this can be allowed without seriously degrading the performance of surrounding cells. Information available for secondary carrier selection (or release in case of lower offered traffic) could include both local eNode-B measurements, measurements from active terminals attached to the cell, as well as limited side-information from the surrounding eNode-Bs. The latter may include information of which component carrier's different neighboring eNode-Bs have selected for primary and secondary, as well as signaling to allow one eNode-B to indicate if it is experiencing severe quality problems on certain component carriers.

DETAILED DESCRIPTION OF EXEMPLARY EMBODIMENTS

There is a need for some information exchange between neighboring nodes of systems as described above to allow for example convergence in the selection of the component carriers that results in the optimal frequency re-use, conditioned on the offered traffic, etc. In order to be able to fully accommodate such cases, an embodiment of the invention uses over-the-air communication between eNode-Bs which may be within the LTE-Advanced system bandwidth. A possible solution for facilitating such over-the-air communication between nodes could potentially be via a broadcast channel. Note that over-the-air communication also is expected to be useful for other self optmised networks (SON) or like features, including during initialization and self configuration of new home eNode-Bs that are powered on.

Figure 5:
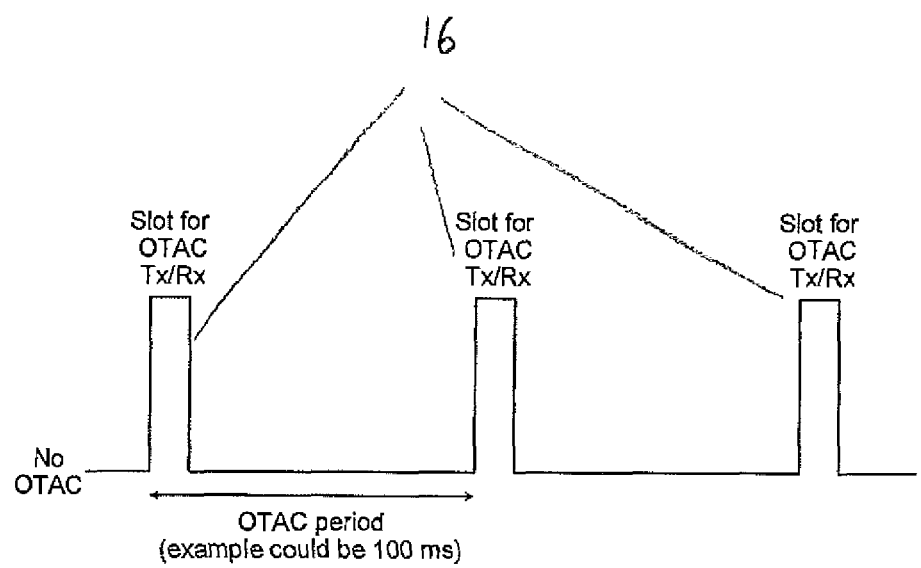
FIG. 5 shows an illustration of one embodiment of the invention where regular periodic time pattern where Node Bs listens for or sends OTAC messages.

In one embodiment of the invention, there are designated timeslots, for example timeslots arranged at regular (periodic) intervals, during the timeslots, all Node Bs either listen to or transmit OTAC messages. FIG. 5 shows one embodiment of how this embodiment may be implemented. At regular intervals, timeslots 16 are designated for transmission and/or reception of OTAC messages between base stations. The periodicity of the time slots may be in one example of an embodiment 100 ms. The periodicity may in one embodiment be fixed in the LTE-Advanced specifications, or operator configurable via e.g. operation and maintenance. In a preferred embodiment of the invention the designated timeslot interval may be the same for all Node Bs. In a preferred embodiment of the invention the pattern of timeslots for co-ordination i.e. OTAC message TX/RX are a function of the system frame number (SFN). The system frame number is a counter that is running in each cell, and simply counts the number of frames elapsed. This number is increased every time a frame has elapsed (10 ms in LTE). The value of the SFN is used for defining the discontinuous reception patterns (DRX) for instance. In general, this SFN is used for any operation that requires timed operation (like paging).

The invention is not limited to this scheme but other alternatives for providing inter-Node B synchronisation of OTAC 'openings' are provided by the invention. In one embodiment the timeslots/intervals between them are based on GPS based timing. In another embodiment the timeslots/intervals between them are based on home Node Bs monitoring and adopting to the patterns of neighbouring Node Bs. If a Node B has no OTAC messages to transmit, then it listens to potential OTAC messages coming from other Node Bs, and try to decode those if such messages are sent.

In one embodiment, if a Node B has an OTAC to be transmitted, then it may transmit the OTAC message in the first coming timeslot, instead of listening to OTAC messages. In another embodiment there may be multiple OTAC resources In one embodiment, the OTAC message is retransmitted after N OTAC time-slot periods, where N is a (pseudo) randomized integer, that is different from each Node B. N may be picked randomly from a set of possible values, or it may be selected as a function of the cell ID (i.e. in that case the value of N will be different for cells that are in the same close vicinity).

The reason for sending the same OTAC message twice or more times at different time-instances, is that some Node Bs may miss reception of such an OTAC message, if at the same time transmitting own OTAC message. With randomized transmission of always retransmitting each OTAC message, the probability of this happing is significantly reduced.

The requirements for OTAC messages in embodiments of the invention is so such messages are sent with a low frequency from Node Bs, i.e. in the order of every five to tens (on event basis). A periodicity of 100 ms (or more) of the time intervals for sending/receiving OTAC messages is considered to be sufficient.

The invention is implemented in one embodiment of the invention at the Node Bs only, and does not require any direct changes or support from terminals. However, specifications in certain embodiments are updated in order to allow timing for implicit channels to reflect the missing Node B transmission times (to handle missing/delayed Ack/Nack for UL data channels). The advantage of the invention is that it is fairly simple to implement and provides sufficiently good performance.

The embodiments of this invention may be implemented by computer software executable by a data processor of the mobile device, such as in the processor entity, or by hardware, or by a combination of software and hardware. Further in this regard it should be noted that any blocks of the logic flow as in the figures may represent program steps, or interconnected logic circuits, blocks and functions, or a combination of program steps and logic circuits, blocks and functions.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. A method of co-ordinating communication between a plurality of base stations in a communication system, comprising:
    at least one of designating and synchronising timeslots where said base stations receive and/or transmit information to each other; and
    determining if a base station has a message to transmit, and if not listening to potential messages coming from other base stations;
    wherein the timeslots are based on monitoring and adapting to time slot patterns and intervals between timeslots of neighbouring base stations.

2. A method as claimed in claim 1 wherein said information pertains to co-ordination of said base stations.

3. A method as claimed in claim 1 wherein said information are over-the-air communication (OTAC) messages.

4. A method as claimed in claim 1 wherein said base stations are part of a cellular communication network.

5. A method as claimed in claim 4 wherein the cellular communication network is an autonomous network.

6. A method as claimed in claim 1 wherein said timeslots are regularly spaced.

7. A method as claimed in claim 1 wherein the timeslots are a function of system frame number (SFN).

8. A method as claimed in claim 1 where the base station is an eNodeB.

9. A non-transitory computer readable medium comprising a computer program thereon, where execution of said computer program by a data processing entity results in performing the method claim of claim 1.

10. The method of claim 1, further comprising determining if a base station has a co-ordination message to be transmitted, and if so transmitting the information in a first coming timeslot.

11. A method as claimed in claim 10 wherein the information is retransmitted automatically.

12. A method of co-ordinating communication between a plurality of base stations in a communication system, comprising:
    at least one of designating and synchronising timeslots where said base stations receive and/or transmit information to each other,
    wherein the information is retransmitted after N timeslots periods, where N is a (pseudo) random integer; and
    wherein the information is retransmitted after N timeslots periods wherein N is different from and varies between different base stations.

13. A method as claimed in claim 12 wherein the information is retransmitted after N timeslots periods wherein N is based on base station ID.

14. A base station comprising:
    at least one antenna for wireless communication, and
    a data processing entity connected with a memory that stores computer software, where execution of the computer software by the data processing entity results in the base station being configured to receive and/or transmit information to or from one or more other base stations during at least one of designated and synchronised timeslots; and
    to determine if the base station has co-ordination information to transmit, and if not to listen to messages from other base stations;
    wherein the timeslots are based on monitoring and adapting to time slot patterns and intervals between timeslots of neighbouring base stations.

15. A base station as claimed in claim 14 wherein said co-ordination information is information pertaining to co-ordination of a plurality of base stations in a communication system.

16. A base station as claimed in claim 15 which is part of a cellular communication network.

17. A base station as claimed in claim 14 wherein said information is over-the-air communication (OTAC) messages.

18. A base station as claimed in claim 14 which is part of an autonomous network.

19. A base station as claimed in claim 14 wherein said timeslots are regularly spaced.

20. A base station as claimed in claim 14 wherein timing of the timeslots is a function of system frame number (SFN).

21. A base station as claimed in claim 14 having means to retransmit the message.

22. A base station as claimed in claim 14 wherein the information is retransmitted after N time-slot periods, wherein N is based on base station ID.

23. A base station as claimed in claim 14 which is an eNodeB.

24. The base station of claim 14 wherein if it is determined that the base station has co-ordination information to transmit, transmitting the information in a next timeslot.

25. A base station comprising:
 at least one antenna for wireless communication, and
 a data processing entity connected with a memory that stores computer software, where execution of the computer software by the data processing entity results in the base station being configured to receive and/or transmit information to or from one or more other base stations during at least one of designated and synchronised timeslots,
 wherein the information is retransmitted after N time-slot periods, where N is a (pseudo) random integer; and
 wherein the information is retransmitted after N time-slot periods, wherein N is different from and varies to other base stations.

26. A communication system comprising:
 a plurality of base stations, each of said base stations comprising at least one antenna for wireless communication and a data processing entity connected with a memory that stores computer software, where execution of the computer software by the data processing entity results in each said base station being adapted to receive and/or transit information to or from one or more other base stations during at least one of designated and synchronised timeslots; and
 to determine if the base station has co-ordination information to transmit, and if not to listen to messages from other base stations;
 wherein the timeslots are based on monitoring and adapting to time slot patterns and intervals between timeslots of neighbouring base stations.

27. A communication system as claimed in claim 26 wherein said co-ordination information pertains to co-ordination of the plurality of said base stations.

28. A communication system as claimed in claim 26 wherein said communication system is an autonomous cellular communication system.

29. The communication system of claim 26, wherein if it is determined that the base station has co-ordination information to transmit, transmitting the information in a next timeslot.

30. A non-transitory computer readable medium that stores computer software, where execution of the computer software by a data processor results in performance of operations comprising:
 at least one of designating and synchronising timeslots where said base stations receive and/or transmit information to each other; and
 determining if a base station has a message to transmit, and if not listening to potential messages coming from other base stations;
 wherein the timeslots are based on monitoring and adapting to time slot patterns and intervals between timeslots of neighbouring base stations.

31. A non-transitory computer readable medium that stores computer software, where execution of the computer software by a data processor results in performance of operations to co-ordinate communication between a plurality of base stations in a communication system, the operations comprising:
 at least one of designating and synchronising timeslots where said base stations receive and/or transmit information to each other,
 wherein the information is retransmitted after N timeslots periods, where N is a (pseudo) random integer; and
 wherein the information is retransmitted after N timeslots periods wherein N is different from and varies between different base stations.

\* \* \* \* \*